US008602222B2

(12) United States Patent
Nakatsuji et al.

(10) Patent No.: US 8,602,222 B2
(45) Date of Patent: Dec. 10, 2013

(54) COMPOSITE SEMIPERMEABLE MEMBRANES, METHODS FOR PRODUCTION THEREOF AND USES THEREOF

(75) Inventors: Koji Nakatsuji, Shiga (JP); Hiroki Tomioka, Shiga (JP)

(73) Assignee: Toray Industries, Inc., Tokyo (JP)

( * ) Notice: Subject to any disclaimer, the term of this patent is extended or adjusted under 35 U.S.C. 154(b) by 690 days.

(21) Appl. No.: 12/085,676

(22) PCT Filed: Dec. 13, 2006

(86) PCT No.: PCT/JP2006/324808
§ 371 (c)(1),
(2), (4) Date: Jul. 1, 2008

(87) PCT Pub. No.: WO2007/069626
PCT Pub. Date: Jun. 21, 2007

(65) Prior Publication Data
US 2009/0071903 A1    Mar. 19, 2009

(30) Foreign Application Priority Data

Dec. 16, 2005  (JP) ............................ 2005-362934
Dec. 21, 2005  (JP) ............................ 2005-367584
Apr. 21, 2006  (JP) ............................ 2006-117579

(51) Int. Cl.
    *B01D 71/56*    (2006.01)
    *B01D 71/68*    (2006.01)
(52) U.S. Cl.
    USPC .................. 210/500.38; 210/652; 210/653
(58) Field of Classification Search
    None
    See application file for complete search history.

(56) References Cited

U.S. PATENT DOCUMENTS

| 4,761,234 | A  | * | 8/1988  | Uemura et al. ........... 210/500.38 |
| 5,160,619 | A  |   | 11/1992 | Yamaguchi et al. |
| 5,674,398 | A  |   | 10/1997 | Hirose et al. |
| 5,693,227 | A  | * | 12/1997 | Costa ............................. 210/650 |
| 5,733,602 | A  |   | 3/1998  | Hirose et al. |
| 6,709,590 | B1 |   | 3/2004  | Hirose |
| 2004/0256309 | A1 | * | 12/2004 | Tomioka et al. ............... 210/490 |
| 2007/0039874 | A1 | * | 2/2007  | Kniajanski et al. ...... 210/500.37 |
| 2008/0000843 | A1 | * | 1/2008  | Sasaki et al. ................. 210/753 |

FOREIGN PATENT DOCUMENTS

| JP | 1-180208 A    | 7/1989 |
| JP | 2-115027 A    | 4/1990 |
| JP | 8-10595 A     | 1/1996 |
| JP | 11-19493 A    | 1/1999 |
| JP | 3031763 B2    | 4/2000 |
| JP | 2001-259388 A | 9/2001 |
| JP | 3489922 B2    | 11/2003 |
| JP | 2005-95856 A  | 4/2005 |

\* cited by examiner

*Primary Examiner* — Krishnan S Menon
(74) *Attorney, Agent, or Firm* — Birch, Stewart, Kolasch & Birch, LLP

(57) ABSTRACT

There is provided a composite semipermeable membrane that shows a high salt removal ratio and high performance in rejecting boron that is not dissociated in the neutral region. The composite semipermeable membrane is produced by a process that includes forming a separating functional polyamide layer on a porous substrate film, while using an organic solvent solution containing a specific cyclic aliphatic compound or a specific aromatic compound such that a polyamide molecule that forms the separating functional polyamide layer has a partial structure composed of "a cyclic aliphatic group or an aromatic group having at least two specific substituents, at least one of which contains a heteroatom bond and a carbonyl group at the β or γ position".

10 Claims, 1 Drawing Sheet

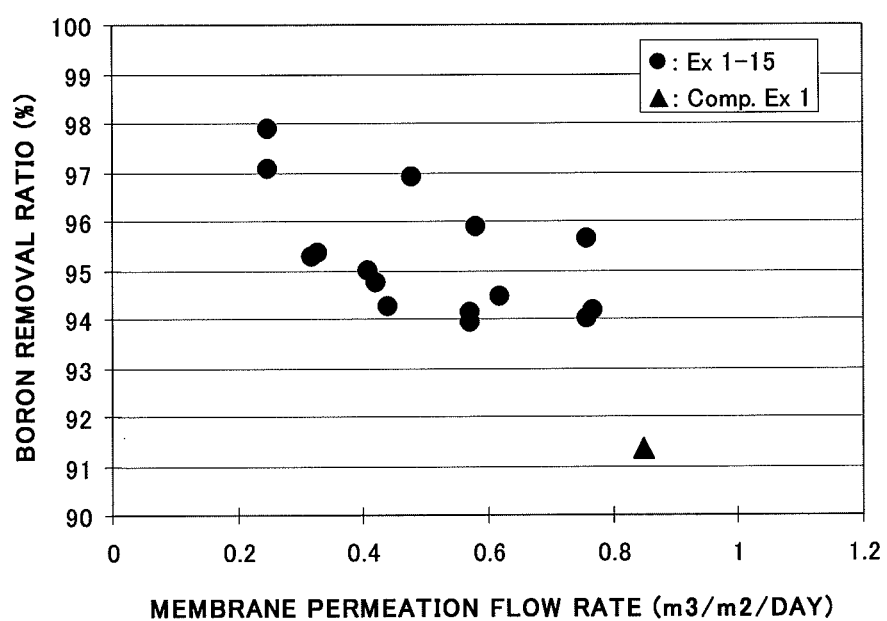

COMPOSITE SEMIPERMEABLE MEMBRANES, METHODS FOR PRODUCTION THEREOF AND USES THEREOF

TECHNICAL FIELD

The invention relates to composite semipermeable membranes useful for selective separation of liquid mixtures and to methods for producing such membranes. Specifically, the invention relates to a composite semipermeable membrane that includes a porous substrate film and a separating functional polyamide layer formed thereon and is preferably used to remove dissolved components such as boron from seawater or brackish water and relates to a method for production thereof.

BACKGROUND ART

In recent years, desalination of seawater with composite semipermeable membranes has been started, and now water treatment plants are practically used for the desalination over the world. Composite semipermeable membranes generally have a composite membrane structure including a porous substrate film covered with a separating functional layer. When made of a crosslinked aromatic polyamide, the separating functional layer has the advantages that: it is highly stiff, because it contains benzene rings; it can be easily produced by interfacial polycondensation of an aromatic polyfunctional amine and an aromatic polyfunctional acid halide; and it can provide high salt removal ratio and high permeation flow rate (see Patent Literatures 1 and 2 below).

Today, high water quality standards are required of desalted water obtained by desalination with composite semipermeable membranes, and the need for the removal performance of composite semipermeable membranes becomes increasingly severe. In particular, the required level of performance for removal of boron, which is contained in a small amount in seawater, becomes increasingly severe.

However, desalination with conventional composite semipermeable membranes has difficulty in reducing the boron content to a level acceptable for drinking water.

Therefore, methods for improving the boron removal performance of composite semipermeable membranes have been proposed such as a method of treating a composite semipermeable membrane module with hot water (see Patent Literature 3 below) and a method of bringing the separating functional polyamide layer into contact with an aqueous bromine-containing free chlorine solution (see Patent Literature 4 below). However, when seawater having a temperature of 25° C., a pH of 6.5, a boron concentration of 5 ppm, and a TDS concentration of 3.5% by weight is subjected to a permeation process with these composite semipermeable membranes for desalination under an operation pressure of 5.5 MPa, the permeation flow rate through the membranes (membrane permeation flow rate) is at most 0.5 m³/m²/day, and the boron removal ratio is at most about 91 to 92%, which are still insufficient. Therefore, there has been a demand for development of composite semipermeable membranes with higher boron-rejection performance.

In order to improve the solute-rejection performance of composite semipermeable membranes, the pore size of the separating functional layer of composite semipermeable membranes may be reduced. In order to achieve sufficient permeability, however, the pore size should be moderately large. On the other hand, even through the pore size of the separating functional layer of composite semipermeable membranes is small, a relatively large number and amount of pores constituting composite semipermeable membranes can provide high permeability. In such a case, however, the solute-rejection performance tends to decrease. In order to improve solute-rejection performance and keep the permeability at a proper level, therefore, both of the pore size and the vacant content of the separating functional layer of composite semipermeable membranes have to be adjusted to appropriate levels.

In order to improve the performance of a composite semipermeable membrane including a porous substrate film and a separating functional polyamide layer formed thereon, investigations have been made on methods of moderately controlling both the pore size and the vacant content of the separating functional layer. A solution is a method that includes adding a new reactant to a reaction liquid to moderately control both the pore size and the vacant content. For example, there is proposed a method that includes allowing a polyamine component having two or more amino groups in the molecule to react with a new reactant, which is an acid component containing a linear aliphatic polyacid halide having two or more haloacyl groups in the molecule, to form a crosslinked polyamide (see Patent Literature 5 below). According to the literature, this method can be achieved by adding some modifications to conventional production methods and useful as a simple method for improvement and can produce a composite semipermeable membrane having high salt-rejection rate and high permeation flow rate. However, this method is still insufficient for increasing the boron-rejection rate to a satisfactory level.

Patent Literature 1: Japanese Patent Application Laid-Open (JP-A) No. 01-180208

Patent Literature 2: JP-A No. 02-115027

Patent Literature 3: JP-A No. 11-19493

Patent Literature 4: JP-A No. 2001-259388

Patent Literature 5: Japanese Patent No. 3031763

DISCLOSURE OF INVENTION

Objects to be Achieved by the Invention

It is an object of the invention to provide a composite semipermeable membrane that shows a high salt removal ratio and high performance in rejecting substances undissociated in the neutral region, such as boron, and to provide a method for producing such a membrane.

Means for Solving the Problems

In order to achieve the object, the invention is directed to a composite semipermeable membrane including a porous substrate film and a separating functional polyamide layer formed on the substrate film, wherein the polyamide that forms the separating functional polyamide layer contains a cyclic aliphatic group and/or an aromatic group in its molecular chain, the cyclic aliphatic group and/or the aromatic group has two or more substituents represented by either Formula (1) or (2) below, and at least one of the substituents is represented by Formula (1).

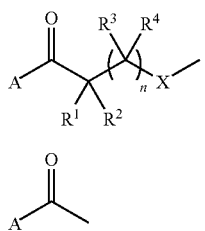

(1)

(2)

wherein n represents 0 or 1, X represents O, S or $NR^5$, $R^1$, $R^2$ and $R^5$ each represent a hydrogen atom or an alkyl group of 1 to 3 carbon atoms, at least one of $R^1$ and $R^2$ is a hydrogen atom, $R^3$ and $R^4$ each represent a hydrogen atom or a $C_1$ to $C_{12}$ alkyl or aromatic group optionally having a substituent other than a carboxyl group, $R^1$ and $R^3$ may be covalently bonded between atoms to form a ring structure, A represents a hydroxyl or a nitrogen of an amide bond of a polyamide molecule, and A in at least one of the at least two substituents is a nitrogen of an amide bond of a polyamide molecule.

The polyamide that forms the separating functional polyamide layer may be a crosslinked polyamide obtained by a process that includes bringing an aqueous polyfunctional amine solution into contact with an organic solvent solution containing a cyclic aliphatic compound and/or an aromatic compound having two or more substituents represented by either Formula (3) or (4) below, wherein at least one of the substituents is represented by Formula (3) below, on the porous substrate film to subject them to interfacial polycondensation.

[Formula (2)]

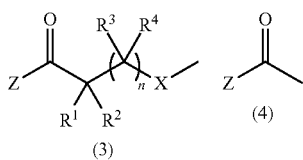

(3)   (4)

wherein n, X and $R^1$ to $R^5$ each have the same meaning as defined above, and Z represents a halogen atom.

The composite semipermeable membrane of the invention may be produced by the method described below.

When the separating functional polyamide layer is formed on the porous substrate film, an aqueous polyfunctional amine solution may be brought into contact with an organic solvent solution containing a polyfunctional acid halide and 5% by mole or more of the cyclic aliphatic compound and/or the aromatic compound having two or more substituents represented by either Formula (3) or (4) based on the amount of the polyfunctional acid halide, wherein at least one of the substituents is represented by Formula (3), on the porous substrate film so that the separating functional polyamide layer can be formed.

Effects of the Invention

According to the invention, there is provided a composite semipermeable membrane that can offer high desalination performance and can reject, at high removal ratio, substances that are not dissociated in the neutral region. When the composite semipermeable membrane of the invention is used as a separation membrane in water treatment, particularly when seawater is desalted using the composite semipermeable membrane of the invention, boron can be rejected at sufficiently high removal ratio, in contrast to conventional techniques which have difficulty in rejecting it at a high level. Therefore, desalination of seawater by reverse osmosis treatment allows the production of high-quality water that meets high water quality standards.

BRIEF DESCRIPTION OF DRAWING

FIG. 1 is a graph showing the relationship between the membrane permeation flow rate and the boron removal ratio with respect to the composite semipermeable membranes prepared in Examples 1 to 15 and Comparative Examples 1 to 3.

BEST MODE FOR CARRYING OUT THE INVENTION

The composite semipermeable membrane of the invention includes a porous substrate film and a separating functional polyamide layer formed on the porous substrate film, wherein the polyamide that forms the separating functional polyamide layer contains a specific cyclic aliphatic group and/or a specific aromatic group in its molecular chain.

The specific cyclic aliphatic group and/or the specific aromatic group has two or more substituents represented by either Formula (1) or (2) below, and at least one of the substituents is represented by Formula (1). Specifically, at least one of the substituents represented by Formula (1) below contains a heteroatom bond and a carbonyl group at the β or γ position. Hereinafter, the cyclic aliphatic group and/or the aromatic group defined in this manner is referred to as "the cyclic aliphatic group and/or the aromatic group having specific substituents." The cyclic aliphatic group and/or the aromatic group having specific substituents may be broadly divided into: the cyclic aliphatic group and/or the aromatic group having one or more substituents represented by Formula (1) below and one or more substituents represented by Formula (2) below; and the cyclic aliphatic group and/or the aromatic group having two or more substituents represented by Formula (1) below.

[Formula 3]

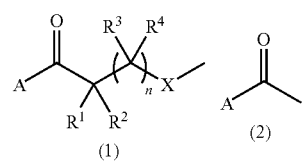

(1)   (2)

wherein n, X, $R^1$ to $R^5$, and A each have the same meaning as defined above.

A process for introducing the cyclic aliphatic group and/or the aromatic group having specific substituents into the molecular chain of the polyamide may include performing interfacial polycondensation of a polyfunctional amine and a polyfunctional acid halide in the presence of a specific cyclic aliphatic compound and/or a specific aromatic compound having substituents represented by either Formula (3) or (4) below.

The specific cyclic aliphatic compound and/or the specific aromatic compound has two or more substituents represented by either Formula (3) or (4) below, and at least one of the substituents is represented by Formula (3) below. Hereinafter, the cyclic aliphatic compound and/or the aromatic compound defined in this manner is referred to as "the cyclic aliphatic compound and/or the aromatic compound having specific substituents." The cyclic aliphatic compound and/or the aromatic compound having specific substituents may be broadly divided into: the cyclic aliphatic compound and/or the aromatic compound having one or more substituents represented by Formula (3) below and one or more substituents represented by Formula (4) below; and the cyclic aliphatic compound and/or the aromatic compound having two or more substituents represented by Formula (3) below.

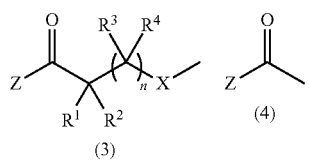

[Formula 4]

wherein n, X, and $R^1$ to $R^5$ each have the same meaning as defined above, and Z represents a halogen atom.

Specifically, an aqueous-polyfunctional amine solution and an organic solvent solution containing the cyclic aliphatic compound and/or the aromatic compound having specific substituents are brought into contact with each other on a porous substrate film to undergo interfacial polycondensation so that a separating functional polyamide layer is formed on the porous substrate film to form a composite semipermeable membrane. In this process, the organic solvent solution containing the cyclic aliphatic compound and/or the aromatic compound having specific substituents preferably further contains a polyfunctional acid halide. At least one of the polyfunctional amine and the polyfunctional acid halide is preferably trifunctional or higher-functional.

More specifically, as described later, the composite semipermeable membrane of the invention may be produced by a method of forming a separating functional polyamide layer on a porous substrate film which includes bringing an aqueous polyfunctional amine solution into contact with an organic solvent solution containing a polyfunctional acid halide and 5% by mole or more of the cyclic aliphatic compound and/or the aromatic compound having specific substituents (based on the amount of the polyfunctional acid halide) to subject them to interfacial polycondensation on the porous substrate film.

In order to provide adequate separation performance and sufficient water permeability, the separating functional polyamide layer of the composite semipermeable membrane may generally have a thickness of 0.01 to 1 μm, preferably of 0.1 to 0.5 μm.

The polyfunctional amine refers to an amine having at least two primary and/or secondary amino groups per molecule. Examples include aromatic polyfunctional amines such as phenylenediamine or xylylenediamine having two amino groups bonded to the benzene ring in the ortho-, meta- or para-positions, 1,3,5-triaminobenzene, 1,2,4-triaminobenzene, and 3,5-diaminobenzoic acid; aliphatic amines such as ethylenediamine and propylenediamine; and alicyclic polyfunctional amines such as 1,2-diaminocyclohexane, 1,4-diaminocyclohexane, piperazine, 1,3-bispiperidylpropane, and 4-aminomethylpiperazine. In particular, aromatic polyfunctional amines having 2 to 4 primary and/or secondary amino groups per molecule are preferred in view of the selective separability or permeability and heat resistance of the membrane. Such aromatic polyfunctional amines that are preferably used include m-phenylenediamine, p-phenylenediamine and 1,3,5-triaminobenzene. In particular, m-phenylenediamine is more preferably used in view of easy availability and handleability. One or more of these polyfunctional amines may be used alone or in any combination.

The polyfunctional acid halide refers to an acid halide having at least two halocarbonyl groups per molecule. Examples include trifunctional acid halides such as trimesic acid chloride, 1,3,5-cyclohexanetricarboxylic acid trichloride, and 1,2,4-cyclobutanetricarboxylic acid trichloride; and bifunctional acid halides such as bifunctional aromatic acid halides such as biphenyldicarboxylic acid dichloride, azobenzenedicarboxylic acid dichloride, terephthalic acid chloride, isophthalic acid chloride, and naphthalenedicarboxylic acid chloride, bifunctional aliphatic acid halides such as adipoyl chloride and sebacoyl chloride, and bifunctional alicyclic acid halides such as cyclopentanedicarboxylic acid dichloride, cyclohexanedicarboxylic acid dichloride and tetrahydrofurandicarboxylic acid dichloride. In view of reactivity with polyfunctional amines, the polyfunctional acid halide is preferably a polyfunctional acid chloride. A polyfunctional aromatic acid chloride having 2 to 4 chlorocarbonyl groups per molecule is preferred in view of the selective separability and the heat resistance of the membrane. Above all, trimesic acid chloride is more preferred in view of easy availability and handleability. One or more of these polyfunctional acid halides may be used alone or in any combination.

The composite semipermeable membrane of the invention can show higher boron removal performance than conventional techniques, because the molecular chain of the polyamide that forms the separating functional layer on the porous substrate film contains "the cyclic aliphatic group and/or the aromatic group having specific substituents".

Methods for introducing "the cyclic aliphatic group and/or the aromatic group having specific substituents" into a partial structure of the separating functional layer-forming polyamide molecule chain include, but are not limited to, a method that includes performing interfacial polycondensation of a polyfunctional amine and a polyfunctional acid halide to form a separating functional layer and bringing the surface of the separating functional layer into contact with a solution containing "the cyclic aliphatic compound and/or the aromatic compound having specific substituents" to introduce "the cyclic aliphatic group and/or the aromatic group having specific substituents"; and a method that includes performing interfacial polycondensation of a polyfunctional amine and a polyfunctional aromatic acid halide in the presence of "the cyclic aliphatic compound and/or the aromatic compound having specific substituents" to introduce "the cyclic aliphatic group and/or the aromatic group having specific substituents" by covalent bonding into the polyamide that forms the separating functional layer.

Specifically, in the process of forming the separating functional polyamide layer on the porous substrate film, an aqueous polyfunctional amine solution, an organic solvent solution containing a polyfunctional acid halide, and another organic solvent solution containing "the cyclic aliphatic compound and/or the aromatic compound having specific substituents" may be brought into contact with one another on the porous substrate film so that they can undergo interfacial polycondensation to form the separating functional polyamide layer. Alternatively, an aqueous polyfunctional amine solution and an organic solvent solution containing a polyfunctional acid halide and "the cyclic aliphatic compound and/or the aromatic compound having specific substituents" may be brought into contact with each other on the porous substrate film so that they can undergo interfacial polycondensation to form the separating functional polyamide layer.

In particular, the composite semipermeable membrane may be produced by a method of forming the separating functional polyamide layer on the porous substrate film which includes bringing an aqueous polyfunctional amine solution into contact with an organic solvent solution containing a polyfunctional acid halide and "the cyclic aliphatic compound and/or the aromatic compound having specific substituents" (based on the amount of the polyfunctional acid halide, the amount of "the cyclic aliphatic compound and/or the aromatic compound having specific substituents" is preferably 5% by mole or more) to subject them to interfacial polycondensation on the porous substrate film. The composite semipermeable membrane produced by this method can satisfy Formula (5), and have a membrane permeation flow rate of 0.5 m$^3$/m$^2$/day or more and a boron removal ratio of 94% or more, when seawater having a temperature of 25° C., a pH of 6.5, a boron concentration of 5 ppm, and a TDS concentration of 3.5% by weight is subjected to a permeation process with the membrane under an operating pressure of 5.5 MPa. Therefore, it shows higher boron removal performance than conventional techniques.

Boron removal ratio (%)≥96−4×(membrane permeation flow rate (m$^3$/m$^2$/day))  [Equation 1]

Examples of "the cyclic aliphatic compound and/or the aromatic compound having specific substituents" including one or more substituents represented by Formula (3) and one or more substituents represented by Formula (4) include 2-chlorocarbonylmethoxybenzoyl chloride, 3-chlorocarbonylmethoxybenzoyl chloride, 4-chlorocarbonylmethoxybenzoyl chloride, 2,3-bischlorocarbonylmethoxybenzoyl chloride, 2,4-bischlorocarbonylmethoxybenzoyl chloride, 2,5-bischlorocarbonylmethoxybenzoyl chloride, 2,6-bischlorocarbonylmethoxybenzoyl chloride, 3,4-bischlorocarbonylmethoxybenzoyl chloride, 3,5-bischlorocarbonylmethoxybenzoyl chloride, 2-chlorocarbonylmethoxycyclohexanecarbonyl chloride, 3-chlorocarbonylmethoxycyclohexanecarbonyl chloride, 4-chlorocarbonylmethoxycyclohexanecarbonyl chloride, 2,3-bischlorocarbonylmethoxycyclohexanecarbonyl chloride, 2,4-bischlorocarbonylmethoxycyclohexanecarbonyl chloride, 2,5-bischlorocarbonylmethoxycyclohexanecarbonyl chloride, 2,6-bischlorocarbonylmethoxycyclohexanecarbonyl chloride, 3,4-bischlorocarbonylmethoxycyclohexanecarbonyl chloride, 3,5-bischlorocarbonylmethoxycyclohexanecarbonyl chloride, 3-chlorocarbonylmethoxyphthaloyl chloride, 4-chlorocarbonylmethoxyphthaloyl chloride, 2-chlorocarbonylmethoxyisophthaloyl chloride, 4-chlorocarbonylmethoxyisophthaloyl chloride, 5-chlorocarbonylmethoxyisophthaloyl chloride, 2-chlorocarbonylmethoxyterephthaloyl chloride, 1-chlorocarbonylmethoxycyclohexane-2,3-dicarbonyl dichloride, 1-chlorocarbonylmethoxycyclohexane-2,4-dicarbonyl dichloride, 1-chlorocarbonylmethoxycyclohexane-2,5-dicarbonyl dichloride, 1-chlorocarbonylmethoxycyclohexane-2,6-dicarbonyl dichloride, 1-chlorocarbonylmethoxycyclohexane-3,4-dicarbonyl dichloride, and 1-chlorocarbonylmethoxycyclohexane-3,5-dicarbonyl dichloride.

Examples of "the cyclic aliphatic compound and/or the aromatic compound having specific substituents" including two or more substituents represented by Formula (3) include (2-chlorocarbonylmethoxyphenoxy)acetyl chloride, (3-chlorocarbonylmethoxyphenoxy)acetyl chloride, (4-chlorocarbonylmethoxyphenoxy)acetyl chloride, (2,3-bischlorocarbonylmethoxyphenoxy)acetyl chloride, (2,4-bischlorocarbonylmethoxyphenoxy)acetyl chloride, (3,5-bischlorocarbonylmethoxyphenoxy)acetyl chloride, (2-chlorocarbonylmethoxycyclohexyloxy)acetyl chloride, (3-chlorocarbonylmethoxycyclohexyloxy)acetyl chloride, (4-chlorocarbonylmethoxycyclohexyloxy)acetyl chloride, (2,3-bischlorocarbonylmethoxycyclohexyloxy)acetyl chloride, (2,4-bischlorocarbonylmethoxycyclohexyloxy)acetyl chloride, (3,5-bischlorocarbonylmethoxycyclohexyloxy)acetyl chloride, (2-chlorocarbonylmethoxycyclopentanyloxy)acetyl chloride, (3-chlorocarbonylmethoxycyclopentanyloxy)acetyl chloride, (2,3-bischlorocarbonylmethoxycyclopentanyloxy)acetyl chloride, and (2,4-bischlorocarbonylmethoxycyclopentanyloxy)acetyl chloride.

One or more of these compounds may be used alone or in any combination.

The composite semipermeable membrane produced by this method may be structured such that it can have a TDS transmission coefficient of $0.1 \times 10^{-8}$ m/s to $3 \times 10^{-8}$ m/s, when seawater having a temperature of 25° C., a pH of 6.5, a boron concentration of 5 ppm, and a TDS concentration of 3.5% by weight is subjected to a permeation process with the membrane under an operating pressure of 5.5 MPa. The composite semipermeable membrane having such a structure can achieve particularly improved boron removal performance. As used herein, the term "TDS" refers to Total Dissolved Solids, and the TDS concentration is an index indicating the salt concentration of seawater.

The TDS transmission coefficient may be calculated by a method of determining the transmission coefficient of the solute as described below. Based on non-equilibrium thermodynamics, the following reverse osmosis transport equations are known:

[Equation 2]

$$Jv = Lp(\Delta P - \sigma \cdot \Delta \pi) \qquad (8)$$

$$Js = P(Cm - Cp) + (1 - \sigma)C \cdot Jv \qquad (9)$$

In the equations, Jv (m$^3$/m$^2$/s) is the permeate flow volume through the membrane, Lp (m$^3$/m$^2$/s/Pa) is the pure water permeability coefficient, $\Delta P$ (Pa) is the difference between the pressures on both sides of the membrane, $\sigma$ is the solute reflection coefficient, $\Delta \pi$ (Pa) is the difference between the osmotic pressures on both sides of the membrane, Js (mol/m$^2$/s) is the solute membrane permeation flow rate, P is transmission coefficient of the solute (m/s), Cm (mol/m$^3$) is the concentration of the solute on the membrane surface, Cp (mol/m$^3$) is the concentration of the permeate, and C (mol/m$^3$) is the concentration on both sides of the membrane. When the difference between the concentrations on both sides is very large as in the case of reverse osmosis membranes, the average concentration C on both sides of the membrane is substantially insignificant. Therefore, Formula (10) which is derived by integrating Formula (9) with respect to the thickness of the membrane is frequently used as an approximation.

[Equation 3]

$$R = \sigma(1-F)/(1-\sigma F) \qquad (10)$$

In the formula, F is Formula (11) below, and R is the true rejection defined by Formula (12) below.

[Equation 4]

$$F = \exp\{-(1-\sigma)Jv/P\} \qquad (11)$$

$$R = 1 - Cp/Cm \qquad (12)$$

Lp may be calculated from Formula (7) with varying ΔP, and R may be measured with varying Jv. Formula (9) or (10) may be curve-fitted to a plot of R and 1/Jv so that P (transmission coefficient of the solute) and σ (the solute reflection coefficient) can be determined at the same time.

In the composite semipermeable membrane of the invention, the porous substrate film, which does not substantially have the function of separating ions or the like, can impart substantial strength to the separating functional layer. There is no particular limitation to the pore size or the pore distribution. For example, a preferred substrate film has uniform pores or pores whose size gradually increases as it goes from the separating functional layer-receiving side to the other side and has a pore size of 0.1 nm to 100 nm at the surface where the separating functional layer is formed.

There is no particular limitation to the materials for use in the porous substrate film or to the shape of the porous substrate film. For example, a preferred porous film comprises polysulfone, cellulose acetate, polyvinyl chloride or any mixture thereof and is reinforced with a fabric of fibers mainly composed of at least one polymer selected from polyester and aromatic polyamide. Particularly preferred is a porous film produced with a chemically, mechanically or thermally stable polysulfone. Specifically, such a polysulfone may comprise a repeating unit represented by the chemical formula below. Such a polysulfone is preferably has the advantage of easy controllability of pore size or high dimensional stability.

[Formula 5]

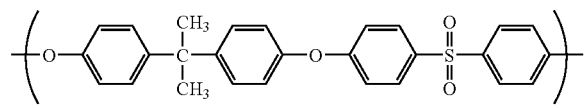

For example, a solution of the above polysulfone in N,N-dimethylformamide may be cast with a constant thickness on a densely-woven polyester fiber fabric or a polyester non-woven fabric (base fabric), and then the polysulfone may be solidified in water by a wet method so that a porous substrate film having pores of a diameter of several tens nm throughout most of the surface can be produced.

The thickness of the porous substrate (including the base fabric) has an effect on the strength of the composite semipermeable membrane and on the packing density of the membrane that forms a membrane element. In order to provide sufficient mechanical strength and sufficient membrane packing density, the thickness of the porous substrate is preferably from 50 to 300 µm, more preferably from 10 to 250 µm. If the substrate is too thin, it can be difficult to provide sufficient mechanical strength. On the other hand, if the substrate is too thick, it can be difficult to provide sufficient membrane packing density. In the porous substrate, the part other than the base fabric (hereinafter referred to as the porous layer) preferably has a thickness of 10 to 200 µm, more preferably of 30 to 100 µm.

The membrane morphology of the porous layer may be observed using a scanning electron microscope, a transmission electron microscope or an atomic force microscope. For example, the porous layer may be separated from the base fabric and then cut by freeze-fracture into a cross-sectional sample to be observed with a scanning electron microscope. The sample may be thinly coated with platinum, platinum-palladium or ruthenium tetrachloride (preferably ruthenium tetrachloride) and then observed at an accelerating voltage of 3 to 6 kV with an ultrahigh resolution field emission scanning electron microscope (UHR-FE-SEM). The ultrahigh resolution field emission scanning electron microscope to be used may be Model S-900 manufactured by Hitachi Ltd. The thickness and the surface pore size of the porous layer may be determined using the resulting electron micrograph. As used herein, the thickness and the pore size each refers to the corresponding average value.

Next, a description is given of methods for producing the composite semipermeable membrane of the invention.

For example, the separating functional polyamide layer of the composite semipermeable membrane may be produced by a process that includes using an aqueous solution containing the polyfunctional amine and an organic solvent solution containing the polyfunctional acid halide and "the cyclic aliphatic compound and/or the aromatic compound having specific substituents" (wherein the organic solvent is immiscible with water) and subjecting these components to interfacial polycondensation on the surface of the porous substrate film to form a polyamide skeleton.

In this process, the concentration of the polyfunctional amine in the aqueous polyfunctional amine solution is preferably from 2.5 to 10% by weight, more preferably from 3 to 5% by weight. In this range, the resulting semipermeable membrane can have sufficient salt removal performance and a transmission coefficient of the solute of $3\times10^{-8}$ m/s or less and can be sufficiently permeable to water. The aqueous polyfunctional amine solution may further contain a surfactant, an organic solvent, an alkaline compound, and an antioxidant, as long as they do not inhibit the reaction of the polyfunctional amine with the polyfunctional acid halide. In some cases, the addition of a surfactant or an organic solvent allows efficient interfacial polycondensation, because the surfactant can improve the wettability of the surface of the porous substrate film and reduce the interfacial tension between the aqueous amine solution and the non-polar solvent or because the organic solvent can serve as a catalyst for the interfacial polycondensation reaction.

In order to perform interfacial polycondensation on the porous substrate film, the aqueous polyfunctional amine solution may be first brought into contact with the surface of the porous substrate film. In a preferred mode, the solution is uniformly and continuously brought into contact with the surface of the porous substrate film. Specifically, for example, a method of coating the porous substrate film with the aqueous polyfunctional amine solution or a method of immersing the porous substrate film in the aqueous polyfunctional amine solution may be used. The contact between the surface of the porous substrate film and the aqueous polyfunctional amine solution is preferably held for a time period of 1 to 10 minutes, more preferably of 1 to 3 minutes.

After the aqueous polyfunctional amine solution is brought into contact with the surface of the porous substrate film, the substrate film is well drained such that no liquid droplet remains on the substrate film. If some liquid droplets are left on the substrate film, the liquid droplet portions can cause membrane defects after the formation of the separating functional layer. In order to produce a high-performance composite semipermeable membrane with no membrane defect, therefore, sufficient draining should be performed. The draining method may be a method that includes vertically holding the porous substrate film after the contact with the aqueous polyfunctional amine solution such that the excess aqueous solution is allowed to freely flow downwardly or a method that includes spraying nitrogen or any other gas from an air nozzle to perform forced draining. After the draining, the surface of the film may be dried such that part of deposited water can be removed.

Subsequently, the substrate film that has been brought into contact with the aqueous polyfunctional amine solution may be brought into contact with an organic solvent solution containing the polyfunctional acid halide and "the cyclic aliphatic compound and/or the aromatic compound having specific substituents" so that the polyfunctional amine, the polyfunctional acid halide, and "the cyclic aliphatic compound and/or the aromatic compound having specific substituents" undergo interfacial polycondensation to form the skeleton of the separating functional crosslinked polyamide layer.

The concentration of the polyfunctional acid halide in the organic solvent solution is preferably from 0.01 to 10% by weight, more preferably from 0.02 to 2.0% by weight. In this range, sufficient reaction rate can be obtained, and side reactions can be suppressed. In a more preferred mode, a carbonylation catalyst such as N,N-dimethylformamide may be added to the organic solvent solution so that the interfacial polycondensation can be facilitated.

The organic solvent used in this process should be immiscible with water. The organic solvent is also preferably capable of solubilizing the polyfunctional acid halide and incapable of destroying the porous substrate film. An organic solvent inert to the polyfunctional amine compound and the polyfunctional acid halide may be used. Preferred examples of the organic solvent include hydrocarbon compounds such as n-hexane, n-octane, and n-decane.

The organic solvent solution containing the polyfunctional acid halide and "the cyclic aliphatic compound and/or the aromatic compound having specific substituents" may be brought into contact with the aqueous polyfunctional amine solution on the substrate film by the application of the organic solvent solution similarly to the method of coating the surface of the porous substrate film with the aqueous polyfunctional amine solution.

As described above, the excess organic solvent is preferably drained, after the organic solvent solution containing the polyfunctional acid halide and "the cyclic aliphatic compound and/or the aromatic compound having specific substituents" is brought into contact for interfacial polycondensation to form a separating functional layer comprising a crosslinked polyamide on the porous substrate film. The draining method may be a method that includes vertically holding the film such that the excess organic solvent is allowed to freely flow downwardly and removed. In this method, the vertical holding is preferably performed for 1 to 5 minutes, more preferably for 1 to 3 minutes. If the holding time is too short, the separating functional layer can be insufficiently formed. If the holding time is too long, the organic solvent can be excessively dried away so that defects can be easily produced to cause a reduction in membrane performance.

In a method for producing the composite semipermeable membrane of the invention, for example, the separating functional polyamide layer may be formed by a process that includes bringing the organic solvent solution containing the polyfunctional acid halide and "the cyclic aliphatic compound and/or the aromatic compound having specific substituents" into contact, on the substrate film, with the aqueous polyfunctional amine solution in contact with the substrate film to subject them to interfacial polycondensation. Alternatively, the polyfunctional acid halide may be brought into contact, on the substrate film, with the aqueous polyfunctional amine solution in contact with the substrate film so that they can be subjected to interfacial polycondensation to form a separating functional layer comprising a crosslinked polyamide, and then the organic solvent solution containing "the cyclic aliphatic compound and/or the aromatic compound having specific substituents" may be brought into contact with the polyamide of the separating functional layer on the substrate film such that they can react with one another.

In this process, the concentration of the polyfunctional acid halide in the organic solvent solution is preferably from 0.01 to 10% by weight, more preferably from 0.02 to 2% by weight. When the concentration is 0.01% by weight or more, a sufficient reaction rate can be obtained. When the concentration is 10% by weight or less, side reactions can be suppressed. An acylation catalyst such as N,N-dimethylformamide is also preferably added to the organic solvent solution, because it can facilitate the interfacial polycondensation.

When "the cyclic aliphatic compound and/or the aromatic compound having specific substituents" is brought into contact after the separating functional layer is substantially formed by interfacial polycondensation of the polyfunctional amine and the polyfunctional acid halide, the amount of the cyclic aliphatic compound and/or the aromatic compound having specific substituents is preferably 5% by mole or more, based on the amount of the polyfunctional acid halide. If the amount is less than 5% by mole, the boron-rejection effect can tend to be insufficient. The amount is preferably at most 100% by mole or less, because a large amount of more than 100% by mole cannot further enhance the boron-rejection effect but can rather cause environmental deterioration due to a large amount of the unreacted reagent or increase an economic burden for the treatment. Thus, the amount is more preferably from 5 to 50% by mole. On the other hand, when a single solution of the polyfunctional acid halide and "the cyclic aliphatic compound and/or the aromatic compound having specific substituents" in an organic solvent is brought into contact with the polyfunctional amine on the separating film such that they are allowed to react to form the separating functional layer, the amount of "the cyclic aliphatic compound and/or the aromatic compound having specific substituents" is preferably 5% by mole or more, more preferably from 5 to 50% by mole, particularly preferably from 5 to 30% by mole, based on the amount of the polyfunctional acid halide. When the amount is 5% by mole or more, the boron removal performance can be effectively improved. When the amount is 50% by mole or less, a reduction in salt removal performance or permeation flow rate can be suppressed.

The composite semipermeable membrane obtained by the method is preferably treated with hot water at a temperature in the range of 50 to 150° C., more preferably in the range of 70 to 130° C., preferably for 1 to 10 minutes, more preferably for 2 to 8 minutes. When the composite semipermeable membrane undergoes the hot water treatment, its exclusion performance and permeability to water can be further improved.

The composite semipermeable membrane of the invention produced as described above may be used as a separation membrane which is installed in a semipermeable membrane element. For example, a flat composite semipermeable membrane according to the invention, a crude water pass material such as a plastic net and a permeate water pass material such as a tricot and optionally a pressure resistance-enhancing film are spirally wound around a water-collecting tube with a large number of through holes so that a spiral composite semipermeable membrane element is produced.

The composite semipermeable membrane element may also be used as a fluid separation element which is installed in a fluid separation system. For example, the composite semipermeable membrane elements are connected in series or parallel and housed in a pressure vessel to form a composite semipermeable membrane module. A pump for feeding crude water to the composite semipermeable membrane element or module and a unit for pretreating the crude water may be used in combination therewith to form a fluid separation system. Crude water is treated with the semipermeable membrane in the fluid separation system so that it can be separated into permeate water such as drinking water and concentrated water not passing through the membrane, and as a result, water of the desired quality can be obtained.

In the fluid separation system, the boron removal ratio can increase with the operating pressure. If the operating pressure increases, however, the energy necessary for the operation may also increase so that the durability of the composite semipermeable membrane can tend to decrease. When the water to be treated is subjected to a permeation process with the composite semipermeable membrane, therefore, the operating pressure is preferably set at from 1.0 MPa to 10 MPa. The temperature of the water that is supplied to the semipermeable membrane and treated is preferably set at from 5° C. to 45° C., because the boron removal ratio tends to decrease as the temperature increases, while the membrane permeation flow rate tends to decrease as the temperature decreases. As the pH of the water being supplied increases, more boron can be dissociated to produce borate ions in the water so that the boron removal ratio can increase. When high salt content water such as seawater is supplied, however, scale such as magnesium scale is more likely to form as the pH increases. The high pH operation can also cause degradation of the membrane. Therefore, the pH of the water being supplied is preferably set in the neutral region.

EXAMPLES

The characteristics of the composite semipermeable membrane of each of the examples and the comparative examples were determined by a process including supplying seawater (with a TDS concentration of about 3.5% and a boron concentration of about 5.0 ppm) to the composite semipermeable membrane under an operating pressure of 5.5 MPa to perform membrane filtration, while controlling the seawater such that it had a temperature of 25° C. and a pH of 6.5, and measuring the quality of the resulting permeate water and the quality of the water supplied. The measurements and the formulae for computation were as follows.

TDS Removal Ratio

The TDS concentration of each of the permeate and the water supplied is measured, and the TDS removal ratio is calculated according to the following formula:

TDS removal ratio (%)=100×{1−(TDS concentration of permeate)/(TDS concentration of water supplied)}  [Equation 5]

Membrane Permeation Flow Rate

When water (seawater) was supplied, the amount (cubic meter) of water passing through the membrane is determined per square meter of the membrane surface per day to give the membrane permeation flow rate ($m^3/m^2$/day).

Boron Removal Ratio

The boron concentration of each of the water supplied and the permeate is analyzed with an ICP emission spectrometer, and the boron removal ratio is determined according to the following formula:

Boron removal ratio (%)=100×{1−(boron concentration of permeate)/(boron concentration of water supplied)}  [Equation 6]

TDS Transmission Coefficient

The TDS transmission coefficient (m/s) is calculated according to the formula below, which is described in "Maku Shori Gijyutsu Taikei (Compendium of Membrane Separation Technology)," the first volume, p. 171, edited by Masayuki Nakagaki, Fuji-technosystem (1991).

TDS transmission coefficient (m/s)={(100−TDS removal ratio)/(TDS removal ratio)}×(membrane permeation flow rate)×115.7×$10^{-7}$  [Equation 7]

The composition of the polymer in the separating functional layer of the composite semipermeable membrane may be evaluated by the method described below.

The presence of "the cyclic aliphatic group and/or the aromatic group having specific substituents" in the molecular chain of the polyamide in the separating functional layer may be analyzed by measuring the solid NMR spectrum of the separating functional layer separated from the substrate film or by a process including heating the sample in an aqueous strong alkali solution to hydrolyze it and subjecting the hydrolyzed sample to HPLC measurement or $^1$H-NMR spectrum measurement.

REFERENCE EXAMPLES

Compounds 1 to 5 shown in Table 1 were synthesized by the methods described below, respectively.

TABLE 1

| Compound No. | Structural Formula | Spectrum Data |
|---|---|---|
| 1 | 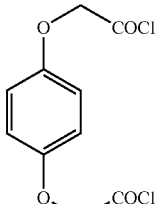 | $^1$H-NMR (CDCl$_3$): δ 4.91 (4H, s), 6.88 (4H, s)<br>IR(ATR): δ = 1798, 1505, 1206, 935, 825, 764 cm$^{-1}$ |
| 2 | 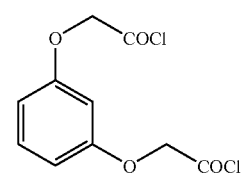 [SMILES: O=C(Cl)COc1cccc(OCC(=O)Cl)c1] | $^1$H-NMR (CDCl$_3$): δ 4.93 (4H, s), 6.49 (1H, dd, J = 2.3, 2.3 Hz), 6.56 (2H, dd, J = 8.2, 2.3 Hz), 7.25 (1H, dd, J = 8.2, 8.2 Hz)<br>IR(ATR): δ = 1804, 1598, 1492, 1182, 1163, 945, 764, 732 cm$^{-1}$ |

TABLE 1-continued

| Compound No. | Structural Formula | Spectrum Data |
|---|---|---|
| 3 | (1,3,5-tris(chlorocarbonylmethoxy)benzene) | $^1$H-NMR (CDCl$_3$): δ 4.90 (6H, s), 6.12 (3H, s)<br>IR(ATR): δ = 1800, 1790, 1606, 1477, 1419, 1178, 983, 966, 938, 799, 770 cm$^{-1}$ |
| 4 | (1,2,4-tris(chlorocarbonylmethoxy)benzene) | $^1$H-NMR (CDCl$_3$): δ 4.90 (2H, s), 4.95 (2H, s), 5.00 (2H, s), 6.49 (1H, dd, J = 8.9, 3.0 Hz), 6.57 (1H, d, J = 3.0 Hz), 6.95 (1H, d, J = 8.9 Hz)<br>IR(ATR): δ = 1793, 1510, 1421, 1208, 1186, 972, 947, 772 cm$^{-1}$ |
| 5 | (1,4-bis(chlorocarbonylmethoxy)cyclohexane) | $^1$H-NMR (CDCl$_3$): δ 1.20-2.00 (8H, m), 3.34-3.56 (2H, m), 4.40-4.44 (4H, m)<br>IR(ATR): δ = 2938, 1802, 1759, 1191, 1156, 1130, 937, 753 cm$^{-1}$ |
| 6 | (3-(chlorocarbonylmethoxy)benzoyl chloride) | $^1$H-NMR (CDCl$_3$): δ 5.03 (2H, s), 7.24 (1H, d, J = 8.5 Hz), 7.45 (1H, t, J = 8.5 Hz), 7.57 (1H, m), 7.82 (1H, d, J = 8.5 Hz) |
| 7 | (5-(chlorocarbonylmethoxy)isophthaloyl dichloride) | $^1$H-NMR (CDCl$_3$): δ 5.08 (2H, s), 7.89 (2H, s), 8.57 (1H, s) |
| 8 | (3,5-bis(chlorocarbonylmethoxy)benzoyl chloride) | $^1$H-NMR (CDCl$_3$): δ 5.00 (4H, s), 6.80 (1H, s), 7.31 (2H, s) |

Reference Example 1

Synthesis of
(4-Chlorocarbonylmethoxyphenoxy)acetyl Chloride
(Compound 1)

In 50.0 ml of N,N-dimethylformamide (hereinafter abbreviated as DMF) were dissolved 5.51 g (50.0 mmol) of hydroquinone and 16.1 g (105.0 mmol) of methyl bromoacetate, and 20.7 g (150.0 mmol) of potassium carbonate was added to the solution and stirred for 12 hours. Water was added to the reaction mixture, and the mixture was extracted with ethyl acetate. The organic layers were then combined, washed with an aqueous sodium hydrogen carbonate solution, water, and an aqueous saturated sodium chloride solution; and dried over anhydrous sodium sulfate. After the drying agent was removed, the product was concentrated under reduced pressure. The resulting residue was recrystallized with methylene chloride/n-hexane to give 10.7 g of a colorless crystal.

To a solution of 7.80 g of the crystal in 30.0 ml of methanol was added 46.0 ml (92.0 mmol) of an aqueous 2 N sodium hydroxide solution over 20 minutes, and the mixture was stirred at room temperature for 12 hours. After hydrochloric acid was slowly added to the reaction mixture under ice cooling to make it acidic (pH 2), methanol was removed by distillation under reduced pressure. The solid precipitate was separated by filtration and dried under reduced pressure to give 6.94 g of a white solid.

In 40.0 ml of dichloroethane was dissolved 2.98 g of the white solid, and 3.39 ml (39.5 mmol) of oxalyl dichloride and 0.01 ml of DMF were added to the solution and stirred at room temperature for 5 hours. After the reaction mixture was filtrated, the filtrate was concentrated under reduced pressure. The resulting residue was recrystallized with methylene chloride/n-hexane to give 1.84 g (6.99 mmol) of a light brown crystal of Compound 1. The total yield was 45%.

Reference Example 2

Compound 2 was synthesized using the process of Reference Example 1, except that resorcinol was used in place of hydroquinone.

Reference Example 3

Compound 3 was synthesized using the process of Reference Example 1, except that phloroglucinol was used in place of hydroquinone.

Reference Example 4

Compound 4 was synthesized using the process of Reference Example 1, except that 1,2,4-trihydroxybenzene was used in place of hydroquinone.

Reference Example 5

Synthesis of
(4-Chlorocarbonylmethoxycyclohexyloxy)acetyl
Chloride (Compound 5)

In 50.0 ml of DMF were dissolved 5.51 g (50.0 mmol) of hydroquinone and 16.1 g (105.0 mmol) of methyl bromoacetate, and 20.7 g (150.0 mmol) of potassium carbonate was added to the solution and stirred for 12 hours. Water was added to the reaction mixture, and the mixture was extracted with ethyl acetate. The organic layers were then combined, washed with an aqueous sodium hydrogen carbonate solution, water and an aqueous saturated sodium chloride solution, and dried over anhydrous sodium sulfate. After the drying agent was removed, the product was concentrated under reduced pressure. The resulting residue was recrystallized with methylene chloride/n-hexane to give 10.7 g of a colorless crystal.

After 20.0 ml of ethanol was added to 254 mg of the crystal and 526 mg (2.0 mmol) of rhodium trichloride trihydrate, the mixture was stirred at room temperature for 2 hours. Thereafter, 20.0 ml of an ethanol solution of 378 mg (10.0 mmol) of sodium borohydride was added dropwise to the mixture over 30 minutes and stirred at room temperature for 12 hours. After the reaction mixture was filtered, 1 N hydrochloric acid was slowly added to the filtrate to make it acidic (pH 2), and ethanol was removed by distillation under reduced pressure. Subsequently, the product was extracted with ethyl acetate, and the organic layers were combined, washed with water and an aqueous saturated sodium chloride solution, and dried over anhydrous sodium sulfate. After the drying agent was removed, the product was concentrated under reduced pressure to give 171 mg of colorless oil.

To a solution of the oil in 20.0 ml of methanol was added dropwise 5.93 ml of an aqueous 1 N sodium hydroxide solution over 5 minutes, and the mixture was stirred at room temperature overnight. The methanol was removed by distillation, and 1 N hydrochloric acid was slowly added to the residue under ice cooling to make it acidic (pH 2). The mixture was then extracted three times with ethyl acetate. The organic layers were combined, washed with water and an aqueous saturated sodium chloride solution and dried over anhydrous sodium sulfate. After the drying agent was removed, the product was concentrated under reduced pressure to give 122 mg of colorless oil.

In 10.0 ml of dichloroethane was dissolved 118 mg of the oil, and 0.132 ml (1.52 mmol) of oxalyl dichloride and 0.01 ml of DMF were added to the mixture and stirred at 40° C. for 1 hour. The reaction mixture was concentrated under reduced pressure to give 170 mg of yellow oil of Compound 5. The total yield was 47%.

Reference Example 6

Compound 6 was synthesized using the process of Reference Example 1, except that methyl 3-hydroxybenzoate was used in place of hydroquinone.

Reference Example 7

Compound 7 was synthesized using the process of Reference Example 1, except that dimethyl 5-hydroxyisophthalate was used in place of hydroquinone.

Reference Example 8

Compound 8 was synthesized using the process of Reference Example 1, except that methyl 3,5-dihydroxybenzoate was used in place of hydroquinone.

Examples 1 to 15 and Comparative Example 1

A 15.3% by weight dimethylformamide (DMF) solution of a polysulfone was cast with a thickness of 200 μm on a polyester nonwoven fabric (0.5 to 1 cc/cm$^2$·sec in air permeability) at room temperature (25° C.) and then immediately immersed in pure water for 5 minutes so that a porous substrate film was prepared.

The resulting porous substrate film (210 to 215 μm in thickness) was immersed in an aqueous 3.4% by weight m-phenylenediamine solution for 2 minutes. The substrate film was then slowly lifted out in the vertical direction, and nitrogen was sprayed from an air nozzle onto the substrate film so that the excess aqueous solution was removed from the surface of the substrate film. An n-decane solution containing 0.175% by weight of trimesic acid chloride and the cyclic aliphatic compound or the aromatic compound of the type and at the concentration shown in Table 2 was then applied to the substrate film such that the surface became completely wet, and the film was allowed to stand for 1 minute. The film was then vertically held for 1 minute such that the excess solution was drained and removed from the film. The film was then washed with hot water at 90° C. for 2 minutes and subsequently immersed for 2 minutes in an aqueous sodium hypochlorite solution whose pH and chlorine concentration were adjusted to 7 and 200 mg/l, respectively. The film was then immersed in an aqueous solution of sodium hydrogen sulfite at a concentration of 1,000 mg/l so that the excess sodium hypochlorite was removed by reduction. The film was then washed with hot water again at 95° C. for 2 minutes.

As a result of evaluation of the resulting composite semipermeable membrane, the membrane permeation flow rate, the TDS removal ratio, the boron removal ratio, and the TDS transmission coefficient were obtained as shown in Table 2 with respect to each example. The relationship between the membrane permeation flow rate and the boron removal ratio is shown in FIG. 1.

TABLE 2

|  | Aromatic Compound or Cyclic Aliphatic Compound Added (Molar Concentration Based on TMC) | Permeation Flow Rate ($m^3/m^2/d$) | TDS Removal Ratio (%) | Boron Removal Ratio (%) | TDS transmission coefficient ($\times 10^{-8}$ m/sec) |
|---|---|---|---|---|---|
| Example 1 | Compound 1 (5 mol %) | 0.76 | 99.71 | 95.65 | 2.56 |
| Example 2 | Compound 1 (10 mol %) | 0.48 | 99.69 | 96.89 | 1.74 |
| Example 3 | Compound 1 (20 mol %) | 0.25 | 99.63 | 97.86 | 1.08 |
| Example 4 | Compound 2 (5 mol %) | 0.58 | 99.82 | 95.89 | 1.77 |
| Example 5 | Compound 3 (5 mol %) | 0.77 | 99.81 | 94.15 | 1.69 |
| Example 6 | Compound 4 (5 mol %) | 0.76 | 99.67 | 94.02 | 2.90 |
| Example 7 | Compound 5 (10 mol %) | 0.32 | 99.65 | 95.27 | 1.30 |
| Example 8 | Compound 6 (5 mol %) | 0.62 | 99.89 | 94.44 | 0.82 |
| Example 9 | Compound 6 (10 mol %) | 0.42 | 98.62 | 94.75 | 1.22 |
| Example 10 | Compound 6 (20 mol %) | 0.25 | 99.78 | 97.08 | 0.64 |
| Example 11 | Compound 7 (10 mol %) | 0.57 | 99.88 | 93.91 | 0.80 |
| Example 12 | Compound 7 (20 mol %) | 0.44 | 99.68 | 94.25 | 1.26 |
| Example 13 | Compound 8 (5 mol %) | 0.57 | 99.89 | 94.14 | 0.76 |
| Example 14 | Compound 8 (10 mol %) | 0.41 | 99.61 | 94.97 | 1.16 |
| Example 15 | Compound 8 (20 mol %) | 0.33 | 99.65 | 95.35 | 0.93 |
| Comparative Example 1 | Absent | 0.85 | 99.85 | 91.34 | 1.44 |

Note:
Compounds 1 to 8 are each an aromatic compound or a cyclic aliphatic compound having the corresponding structural formula shown in Table 1.

INDUSTRIAL APPLICABILITY

The composite semipermeable membrane of the invention can achieve high salt removal ratio and high permeation flow rate and show high performance in rejecting substances that are not dissociated in the neutral region, such as boron. Therefore, the composite semipermeable membrane of the invention is suitable for use in applications for treating cooling water in nuclear power plants or treating plating waste water, applications for the production of drinking water or the like by desalination of high concentration brackish water or seawater, and other applications.

The invention claimed is:
1. A composite semipermeable membrane, comprising:
a porous substrate film; and
a separating functional polyamide layer formed on the substrate film, wherein
the polyamide that forms the separating functional polyamide layer contains a cyclic aliphatic group and/or an aromatic group in its molecular chain,
the cyclic aliphatic group and/or the aromatic group has at least two substituents represented by either Formula (1) or (2), wherein one or more of the at least two substituents is represented by Formula (1):

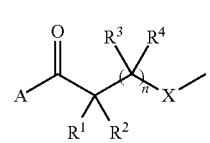

(1)

(2)

wherein n represents 0 or 1,
X represents O or S,
$R^1$ and $R^2$ each represents a hydrogen atom or an alkyl group of 1 to 3 carbon atoms, wherein at least one of $R^1$ and $R^2$ is a hydrogen atom,
$R^3$ and $R^4$ each represents a hydrogen atom or a $C_1$ to $C_{12}$ alkyl or aromatic group optionally having a substituent other than a carboxyl group,
$R^1$ and $R^3$ are optionally covalently bonded between atoms to form a ring structure,
A represents a hydroxyl group or a nitrogen of an amide bond of a polyamide molecule, and
A in at least one of the at least two substituents is a nitrogen of an amide bond of a polyamide molecule.

2. The composite semipermeable membrane according to claim 1, wherein the polyamide that forms the separating functional polyamide layer is a crosslinked polyamide obtained by a process that comprises bringing an aqueous polyfunctional amine solution into contact with an organic solvent solution on the porous substrate film to subject them to interfacial polycondensation, wherein said organic solvent solution contains a cyclic aliphatic compound and/or an aromatic compound having at least two substituents represented by either Formula (3) or (4), wherein one or more of the at least two substituents is represented by Formula (3):

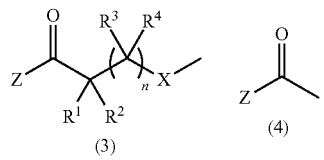

wherein n represents 0 or 1,
X represents O or S,
$R^2$ represents a hydrogen atom or an alkyl group of 1 to 3 carbon atoms,
at least one of $R^1$ and $R^2$ is a hydrogen atom,
$R^3$ and $R^4$ each represents a hydrogen atom or a $C_1$ to $C_{12}$ alkyl or aromatic group optionally having a substituent other than a carboxyl group,
$R^1$ and $R^3$ are optionally covalently bonded between atoms to form a ring structure, and
Z represents a halogen atom.

3. The composite semipermeable membrane according to claim 2, wherein the cyclic aliphatic compound or the aromatic compound is at least one selected from the group consisting of:
2-chlorocarbonylmethoxybenzoyl chloride, 3-chlorocarbonylmethoxybenzoyl chloride, 4-chlorocarbonylmethoxybenzoyl chloride, 2,3-bischlorocarbonylmethoxybenzoyl chloride, 2,4-bischlorocarbonylmethoxybenzoyl chloride, 2,5-bischlorocarbonylmethoxybenzoyl chloride, 2,6-bischlorocarbonylmethoxybenzoyl chloride, 3,4-bischlorocarbonylmethoxybenzoyl chloride, 3,5-bischlorocarbonylmethoxybenzoyl chloride, 2-chlorocarbonylmethoxycyclohexanecarbonyl chloride, 3-chlorocarbonylmethoxycyclohexanecarbonyl chloride, 4-chlorocarbonylmethoxycyclohexanecarbonyl chloride, 2,3-bischlorocarbonylmethoxycyclohexanecarbonyl chloride, 2,4-bischlorocarbonylmethoxycyclohexanecarbonyl chloride, 2,5-bischlorocarbonylmethoxycyclohexanecarbonyl chloride, 2,6-bischlorocarbonylmethoxycyclohexanecarbonyl chloride, 3,4-bischlorocarbonylmethoxycyclohexanecarbonyl chloride, 3,5-ischlorocarbonylmethoxycyclohexanecarbonyl chloride, 3-chlorocarbonylmethoxyphthaloyl chloride, 4-chlorocarbonylmethoxyphthaloyl chloride, 2-chlorocarbonylmethoxyisophthaloyl chloride, 4-chlorocarbonylmethoxyisophthaloyl chloride, 5-chlorocarbonylmethoxyisophthaloyl chloride, 2-chlorocarbonylmethoxyterephthaloyl chloride, 1-chlorocarbonylmethoxycyclohexane-2,3-dicarbonyl dichloride, 1-chlorocarbonylmethoxycyclohexane-2,4-dicarbonyl dichloride, 1-chlorocarbonylmethoxycyclohexane-2,5-dicarbonyl dichloride, 1-chlorocarbonylmethoxycyclohexane-2,6-dicarbonyl dichloride, 1-chlorocarbonylmethoxycyclohexane-3,4-dicarbonyl dichloride, and 1-chlorocarbonylmethoxycyclohexane-3,5-dicarbonyl dichloride.

4. The composite semipermeable membrane according to claim 2, wherein the cyclic aliphatic compound or the aromatic compound is at least one selected from the group consisting of
(2-chlorocarbonylmethoxyphenoxy)acetyl chloride,
(3-chlorocarbonylmethoxyphenoxy)acetyl chloride,
(4-chlorocarbonylmethoxyphenoxy)acetyl
(2,3-bischlorocarbonylmethoxyphenoxy)acetyl chloride,
(2,4-bischlorocarbonylmethoxyphenoxy)acetyl chloride,
(3,5-bischlorocarbonylmethoxyphenoxy)acetyl chloride,
(2-chlorocarbonylmethoxycyclohexyloxy)acetyl chloride,
(3-chlorocarbonylmethoxycyclohexyloxy)acetyl chloride,
(4-chlorocarbonylmethoxycyclohexyloxy)acetyl chloride,
(2,3-bischlorocarbonylmethoxycyclohexyloxy)acetyl chloride,
(2,4-bischlorocarbonylmethoxycyclohexyloxy)acetyl chloride,
(3,5-bischlorocarbonylmethoxycyclohexyloxy)acetyl chloride,
(2-chlorocarbonylmethoxycyclopentanyloxy)acetyl chloride,
(3-chlorocarbonylmethoxycyclopentanyloxy)acetyl chloride,
(2,3-bischlorocarbonylmethoxycyclopentanyloxy)acetyl chloride, and
(2,4-bischlorocarbonylmethoxycyclopentanyloxy)acetyl chloride.

5. The composite semipermeable membrane according to claim 1, wherein when seawater having a temperature of 25° C., a pH of 6.5, a boron, concentration of 5 ppm, and a TDS concentration of 3.5% by weight is subjected to a permeation process with the membrane under an operating pressure of 5.5 MPa, the membrane has a membrane permeation flow rate ($m^3/m^2$/day) and a boron removal ratio (%) that satisfy Formula (5): boron removal ratio (%)≥96-4×(membrane permeation flow rate ($m^3/m^2$/day)) and/or satisfy Formula (6): membrane permeation flow rate≥0.5 ($m^3/m^2$/day) and Formula (7): boron removal ratio≥94 (%).

6. The composite semipermeable membrane according to claim 1, wherein when seawater having a temperature of 25° C., a pH of 6.5, a boron concentration of 5 ppm, and a TDS concentration of 3.5% by weight is subjected to a permeation process with the membrane under an operating pressure of 5.5 MPa, the membrane has a TDS transmission coefficient of $0.1 \times 10^{-8}$ m/s to $3 \times 10^{-8}$ m/s.

7. A method for producing the composite semipermeable membrane according to claim 1, comprising forming a separating functional layer comprising a polyamide on a porous substrate film, wherein an aqueous polyfunctional amine solution is brought into contact with an organic solvent solution containing a polyfunctional acid halide and at least 5% by mole of a cyclic aliphatic compound and/or an aromatic compound having at least two substituents represented by either Formula (3) or (4) based on the amount of the polyfunctional acid halide, wherein at least one of the substituents is represented by Formula (3), on a porous substrate film to subject them to interfacial polycondensation so that the separating functional layer comprising the polyamide is formed.

8. A semipermeable membrane element, comprising the composite semipermeable membrane according to claim 1 as a separation membrane.

9. A fluid separation system, comprising the semipermeable membrane element according to claim 8 as a fluid separation element.

10. A water treatment method, comprising subjecting water to a permeation process with the composite semipermeable membrane according to claim 1.

* * * * *